March 5, 1965

United States Patent Office 3,164,243
Patented Jan. 5, 1965

3,164,243
METHOD AND APPARATUS FOR MAKING FILTER
PLUGS FOR FILTER TIP CIGARETTES
Willy Rudszinat and Bernhard Schubert, Hamburg-Lohbrugge, Germany, assignors to Hauni-Werke Korber & Co. K.G., Hamburg-Bergedorf, Germany
Filed Oct. 6, 1960, Ser. No. 60,929
Claims priority, application Germany Oct. 7, 1959
11 Claims. (Cl. 198—32)

The present invention relates to the manufacture of filter tips for filter tip cigarettes and more particularly to a method of and apparatus for making filter plugs by cutting the same from filter rods of multiple plug length, the lengths so cut being rearranged to form a single file or row of filter plugs which is conducted to a cigarette making machine. Still more particularly, the invention relates to a method of and to an apparatus for transforming rows of coaxial rod-shaped articles into a single file of axially parallel articles.

Filter tip cigarette making machines operating according to a method in which filter plug lengths are fed transversely of their length generally require filter plugs of twice the final length arranged in a single row. Where, as is usually the case, these lengths have been severed from a filter rod having a length which is a multiple of the length of a double length plug while the rod is supported by a correspondingly wide lengthwise grooved drum, the axially aligned double length plugs must first be operated upon so that the individual plugs will be displaced or staggered transversely with respect to each other and then shifted axially, for example by means of guide blades, so as to form a single row of individual filter plugs. It is to be understood that where double length plugs are being made, they are subsequently placed between two axially aligned cigarettes, whereupon the assemblies consisting of cigarettes and filter plugs are severed into two cigarettes by a cut made through the center of the double length filter plug.

It is an object of the invention to provide an improved method of and apparatus for cutting and rearranging the filter plugs by displacing the originally arranged axially aligned plugs during their transverse movement in a circular path in such a manner that all plugs are subsequently arranged in a single row.

The present invention is based on the employment of filter rods of $n$ times the required length and arranged transversely to the feed direction in grooves or holders spaced apart a distance $t$ which is called a circular pitch $t$. The rods are moved in a circular path and are cut into $n$ rod-shaped articles all of which have the same axial length. The articles, hereinafter called filter plugs, are delivered at a common transfer point or station without change in their speed and are all transferred at the same time to the grooves or retainers in adjacent sections or tracks, which grooves have a common circular pitch $t/n$ but, up to a common delivery point or second transfer station, are of such lengths that the originally axially aligned filter plugs are displaced or staggered transversely to move out of axial alignment by the time they reach the second transfer station. At the second station the axially and transversely staggered filter plugs are again transferred, without changing their speed, successively to other grooved tracks or carriers of common circular pitch $t/n$ and in these tracks the plugs are displaced or shifted axially to form a single file or row of plugs which are transferred to a further conveyor means of pitch $t/n$ for processing.

The apparatus according to the invention for carrying out the method employs a conveyor having $n$ adjacent conveying elements or rings of different diameter and provided each with axial retainers or grooves on their circumference. All rings rotate at the same speed and their pitch circle is tangential at the transfer point to the pitch circle of another rotary conveyor means.

The grooved rings are supported at their inner circumference by roller bearings mounted on eccentrically arranged supporting discs. The supporting discs are mounted on a common stub shaft provided with spacer rings and fastened to the machine housing or other frame member. In this way all the grooved rings may be provided with similar internal gear teeth engaged by a common drive in the region of the transfer point of the filter plugs.

With these and other objects in view the invention will now be described in more detail with reference to the accompanying drawings.

Figure 1:
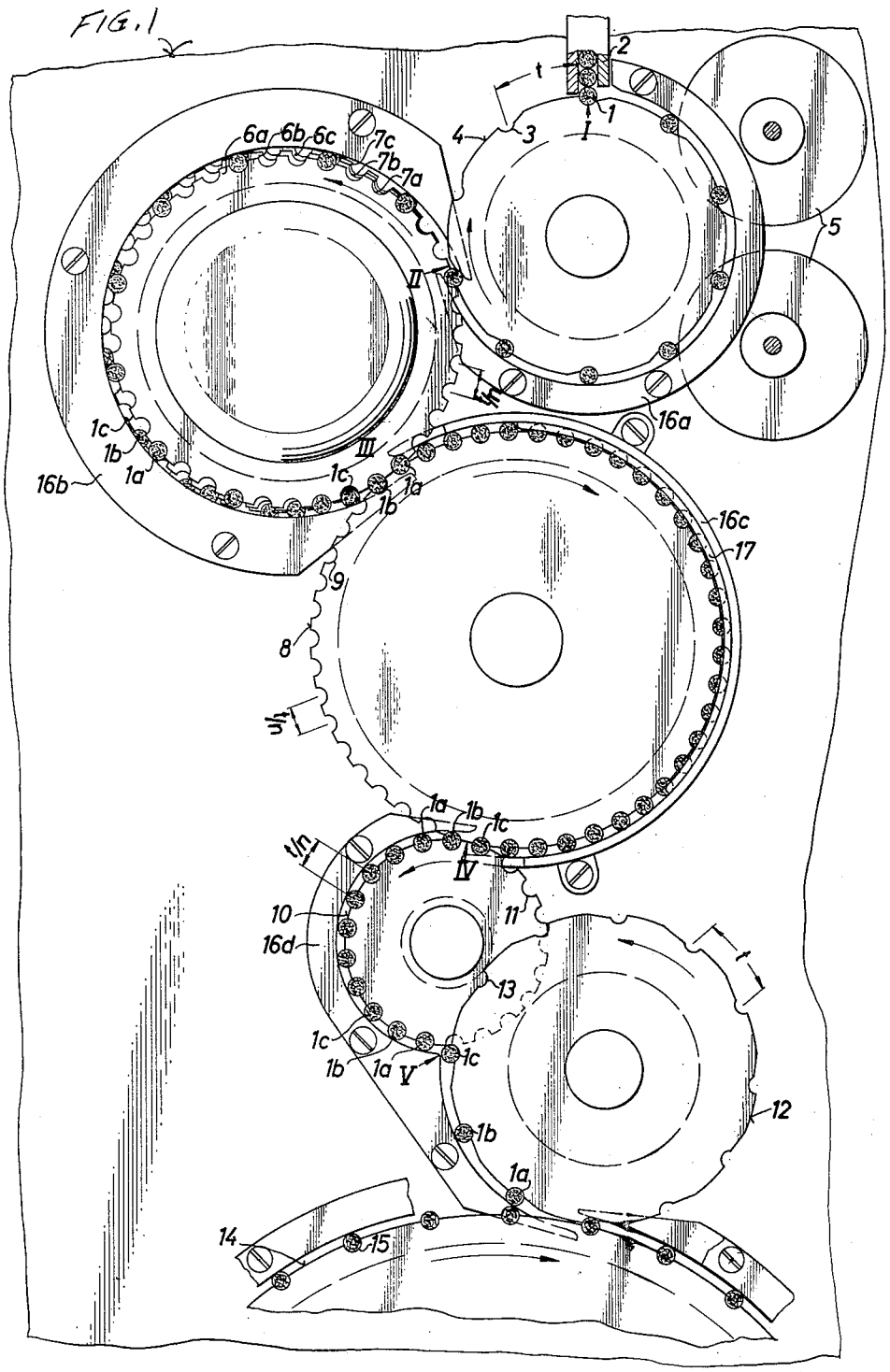
FIG. 1 illustrates diagrammatically a side elevation view of the apparatus for practicing the method of the present invention.

In the example of the invention as shown in FIG. 1 a first conveyor here shown as a drum 4 rotating about a horizontal axis is arranged below a magazine which has stored therein filter rods 1 of multiple plug length. FIG. 1 shows only the discharge duct 2 of the magazine which is provided on its circumference with axially extending holders in the form of grooves 3. These grooves 3 are circumferentially spaced a distance $t$ which is called circular pitch. Two circular cutting devices 5 are provided along the periphery of the rotary drum 4 and each cutting device rotates in a different vertical plane so as to cut the filter rods 1 which are deposited into the grooves 3 of the drum 4 into three aligned rod-shaped plugs of double length.

A curved guide plate 16a extends along a portion of the periphery of the drum 4 for preventing the filter rods and plugs from falling out of the grooves 3. The rows of coaxial plugs form a single file which advances in a direction at right angles to the longitudinal extensions of the rows.

A filter plug transfer device or conveyor consisting of a group of three mutually eccentrically arranged conveying elements or rings 6a, 6b, 6c with axially extending retainers or grooves on their circumferences is arranged adjacent the circumference of the drum 4. These rings are disposed one next to the other in axial direction and the grooves therein are circumferentially spaced a distance equal to $t/n$ wherein $n$ is the number of plugs cut from each rod 1. The number of grooves in the rings 6a, 6b, 6c are in the ratios $(z-1):z:(z+1)$, wherein $z$ designates the number of grooves in one of the three rings. The rings 6a, 6b, and 6c have different diameters and are rotatably supported in such a manner—as will be described later—that the pitch circles of their grooves are tangential at the point or transfer station II to the pitch circle of the grooves in the rotary drum 4 and at the point or transfer station III are tangential to the pitch circle of the carriers or grooves in another rotary conveyor drum 8 which also is provided with axially extending grooves on its circumference.

Arculate guide rails 16b are provided along that section of each ring which extends between the stations II and III. The total axial width of the group of the three rings 6a, 6b, 6c corresponds approximately to the length of one filter rod 1, as also does the width of the first rotary transfer drum 4 and that of the drum 8. The grooves in the drum 8 have a circular pitch $t/n$. Along a portion of the circumference of this drum extends a curved guide plate 16c, and furthermore, deflector or shifting blades 17 (FIG. 6b) are arranged within the region of the plate 16c, the purpose of which will be explained hereinafter.

At the lower portion of the rotary drum 8 is arranged another rotary drum 10 with axially extending grooves having a circular pitch $t/n$ and this drum 10 is provided along a portion of its circumference with a guide plate 16d. An intermediate circular conveyor 12 follows the rotary drum 10 and has a series of peripheral grooves with a circular pitch $t$. The circular conveyor 12 is driven at a higher peripheral speed than the drum 10 and cooperates with a rotary connector drum 14 rotating at the same speed as the conveyor 12. The guide plate 16d facilitates the transfer of the filter plugs.

Figure 2:
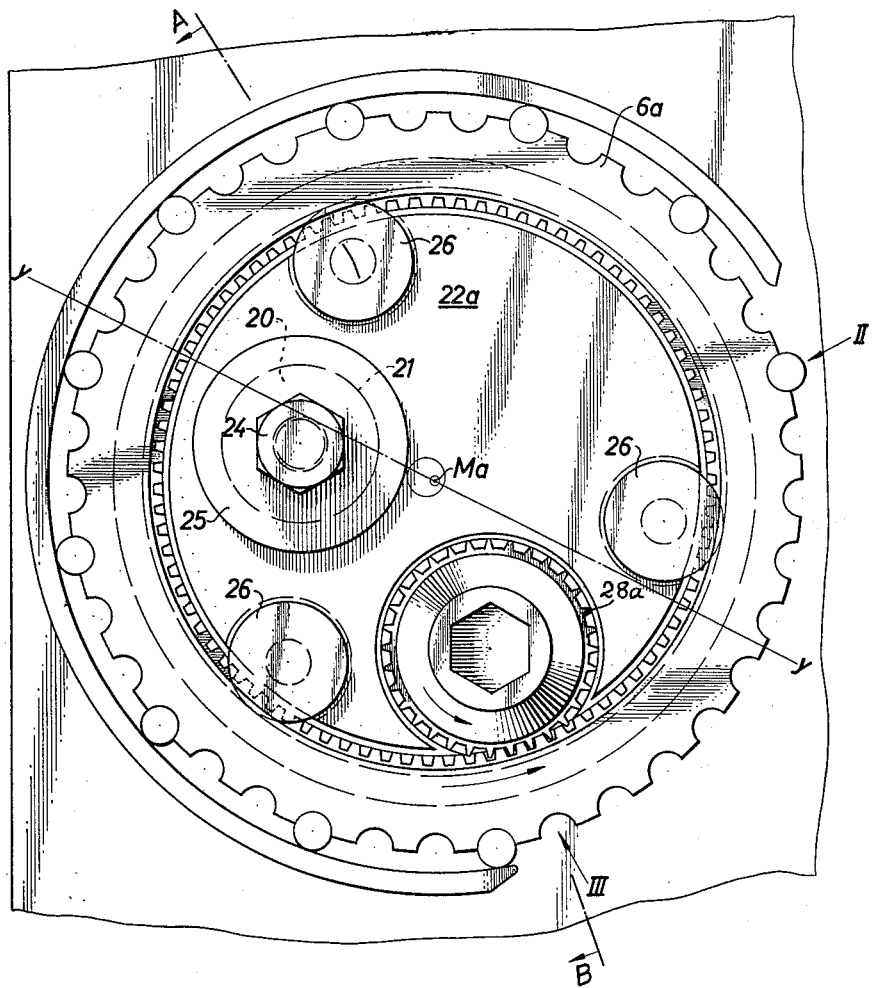
FIG. 2 is an end elevation view of the second filter plug transfer device and shows the foremost rotatable transfer ring of the same and also the stationary supporting disc for this ring, and the arcuate plug guide rail extending along a portion of this ring.
Figure 3:
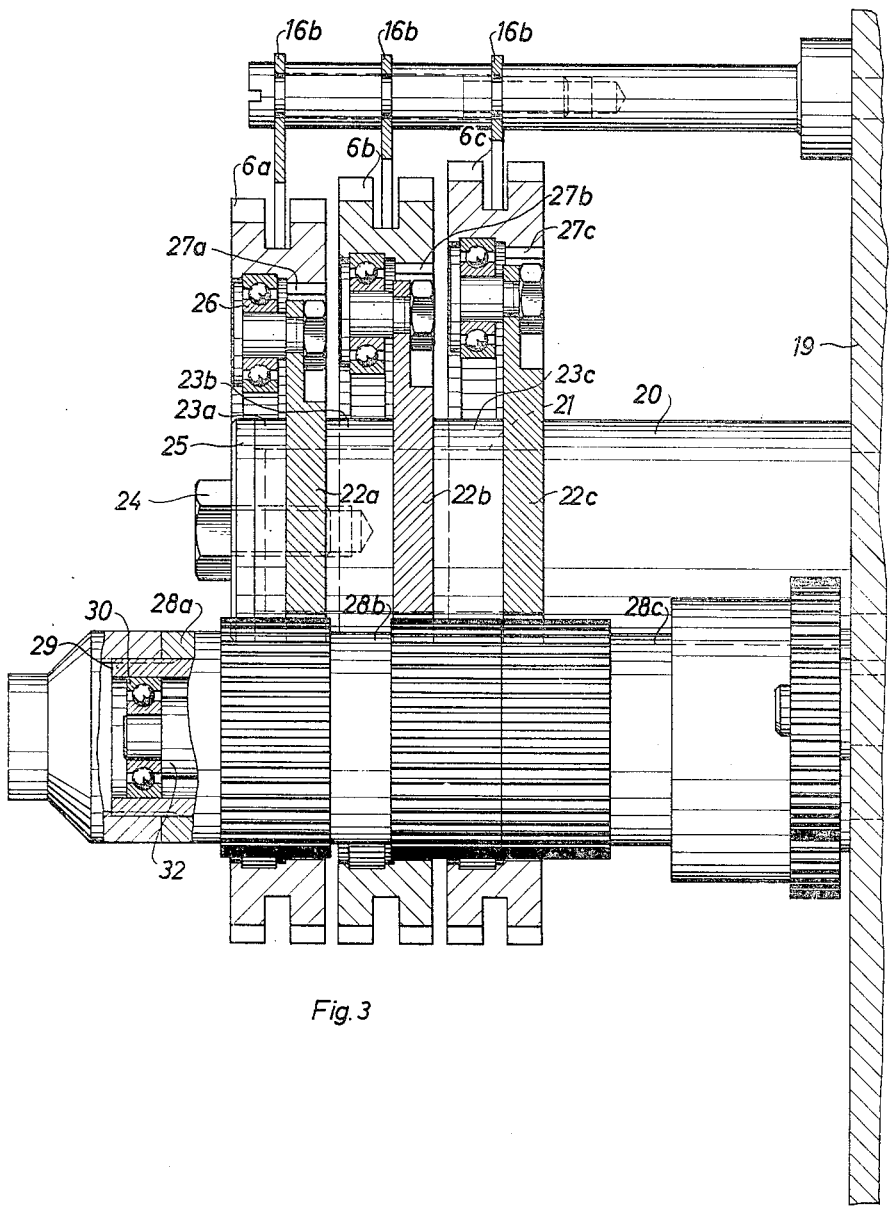
FIG. 3 is a sectional view of the second filter plug transfer device along the line A—B of FIG. 2.
Figure 4:
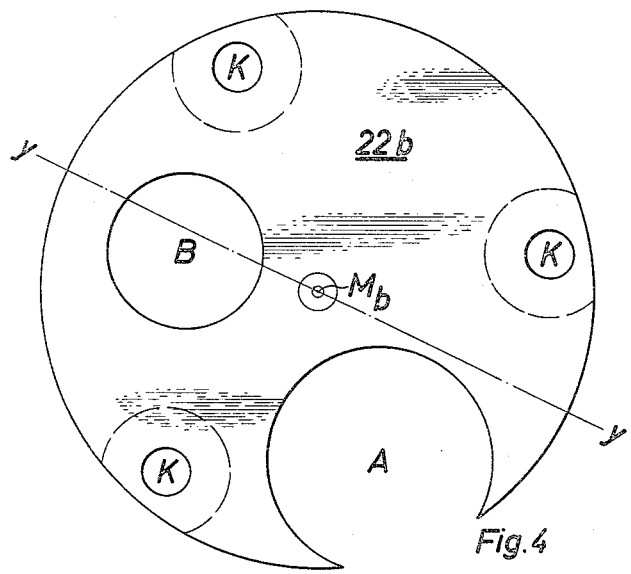
FIG. 4 illustrates an elevation view of the supporting disc for the centrally located rotatable transfer ring.
Figure 5:
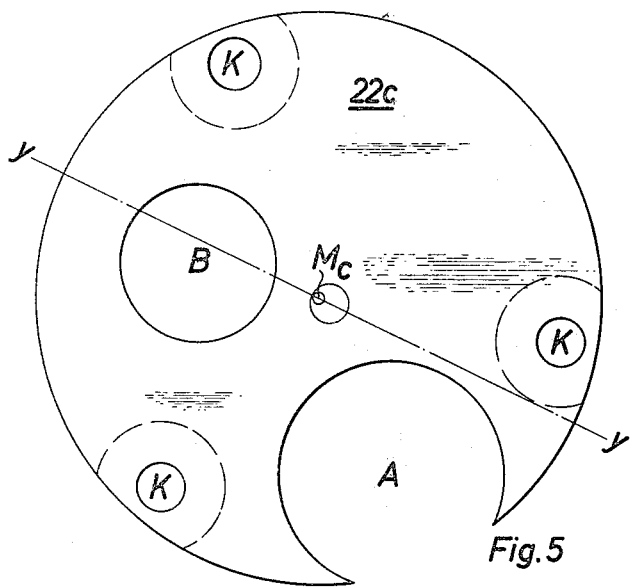
FIG. 5 illustrates an elevation view of the supporting disc for the rearmost rotatable transfer ring when viewing FIG. 2.

The mounting of the rings 6a, 6b, 6c is shown in FIGS. 2 and 3. In FIG. 2 only the smallest ring 6a is shown in its operative position in order to show the construction more clearly. A stub shaft 20 is fastened to the machine casing 19 (FIG. 3) and comprises at its outer end a portion of reduced diameter as shown at 21. Circular supporting discs 22a, 22b, 22c are mounted on this reduced end 21 of the shaft 20 and for this purpose are provided with bores B (FIGS. 4 and 5). Spacer rings 23a, 23b, 23c (FIG. 3) are mounted between the discs 22a, 22b, 22c and a washer 25 and are held together in fixed position by means of a bolt 24. The supporting discs 22a, 22b, 22c have different diameters similar to the rings 6a, 6b, 6c and are so arranged that their centers Ma, Mb, Mc (see FIGS. 2, 4 and 5) lie in a diametrical plane Y—Y which divides the arc between the stations II and III (see FIG. 1) into two halves so that the centers Ma and Mc are at the same distance from but at the opposite sides of the center Mb. Ball bearings 26 (FIGS. 2 and 3) are mounted in bores K (FIGS. 4 and 5) of the supporting discs 22a, 22b, 22c, on which the inner peripheries of the rings 6a, 6b, 6c travel. The rings 6a, 6b, 6c are provided with internal gear teeth 27a, 27b, 27c which have the same pitch diameter and are in engagement with uniformly driven gears 28a, 28b, 28c of the same size and keyed or otherwise fixed to a common drive shaft 29.

The drive shaft 29 is constructed as a hollow shaft mounted by means of roller bearings 30, 31 on a stub shaft 32 fixed attached to the machine casing 19. At the end adjacent the machine casing 19 the drive shaft 29 has a gear 33 formed thereon and attached thereto, which is connected with the drive of the machine. The tubular drive shaft 29 with the gears 28a, 28b, 28c thereon extends through the stationary supporting discs 22a, 22b, 22c which for the purpose mentioned are provided each with a large bore A (FIGS. 4 and 5).

The method and the apparatus according to the invention will now be explained with reference to the FIGS. 1, 6a and 6b. The filter rods 1 are deposited at the point I (FIG. 1) by the magazine duct 2 into the holders or grooves 3 of the rotary conveyor drum 4, the grooves of which are spaced from each other a circular pitch $t$. The filter rods in the example shown have three times the double plug length and are moved consecutively past the cutting devices 5, which have the form of circular knives, and thus are severed into three double length plugs 1a, 1b, 1c. These double length plugs 1a, 1b, 1c being arranged in axial alignment in the grooves 3 are carried forward in clockwise direction to the transfer station II and then are transferred, always three plugs at the same time, without increasing their speed into the retainers or grooves in the rings 6a, 6b, 6c. The latter rotate at the same peripheral speed as the drum 4, or, strictly speaking, one of them does while the others may run at very slightly different peripheral speeds. The grooves in the rings 6a, 6b and 6c are spaced from each other a distance equal to $t/3$ so that only every third groove 7a, 7b, 7c receives each double plug 1a, 1b, 1c (FIG. 7). The grooves in each ring 6a, 6b, 6c are related in their number to each other in the ratio $(z-1):z:(z+1)$, wherein $z$ is the number of grooves in the ring 6b. At the transfer station II the grooves 7a, 7b, 7c in the adjacent rings 6a, 6b, 6c are substantially in axial alignment, and also at the other transfer station III these grooves are in substantial axial alignment.

Figures 6A, 6B:
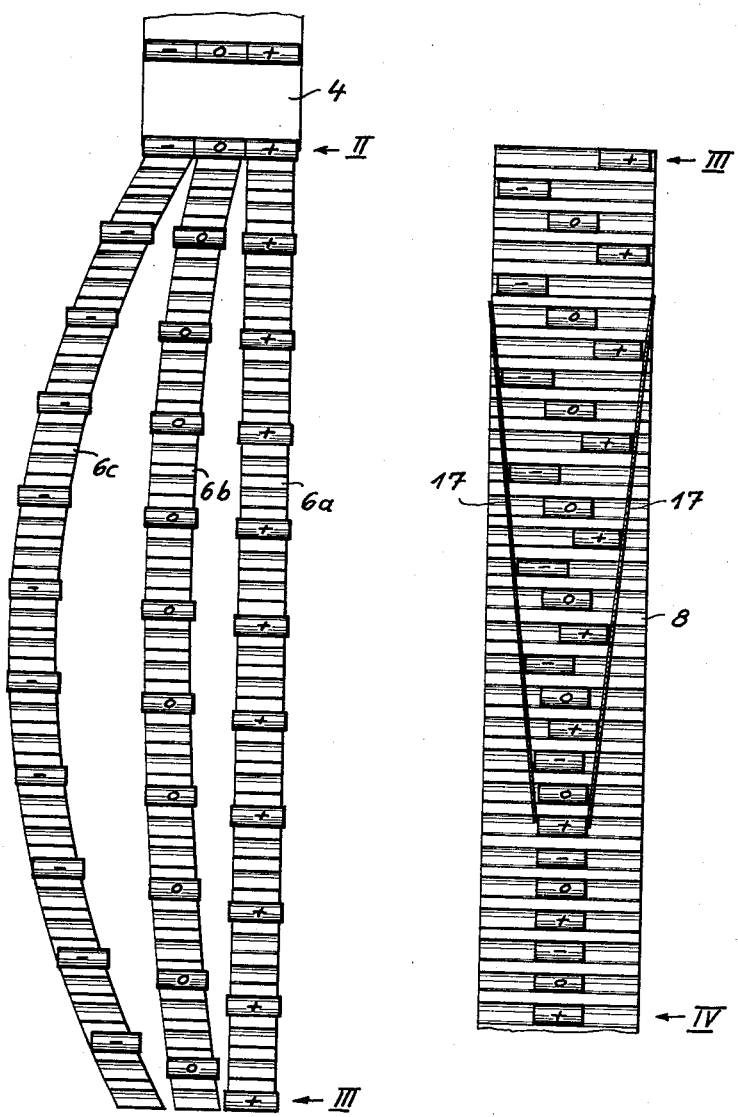
FIG. 6a illustrates a developed view of a portion of the circumferences of the three transfer rings and shows the position of the filter plugs therein.
FIG. 6b illustrates a developed view of a portion of the circumference of the drum forming the third transfer device and illustrates the axial displacement of the filter plugs in the grooves of the drum during the rotation of the latter.
Figure 7:
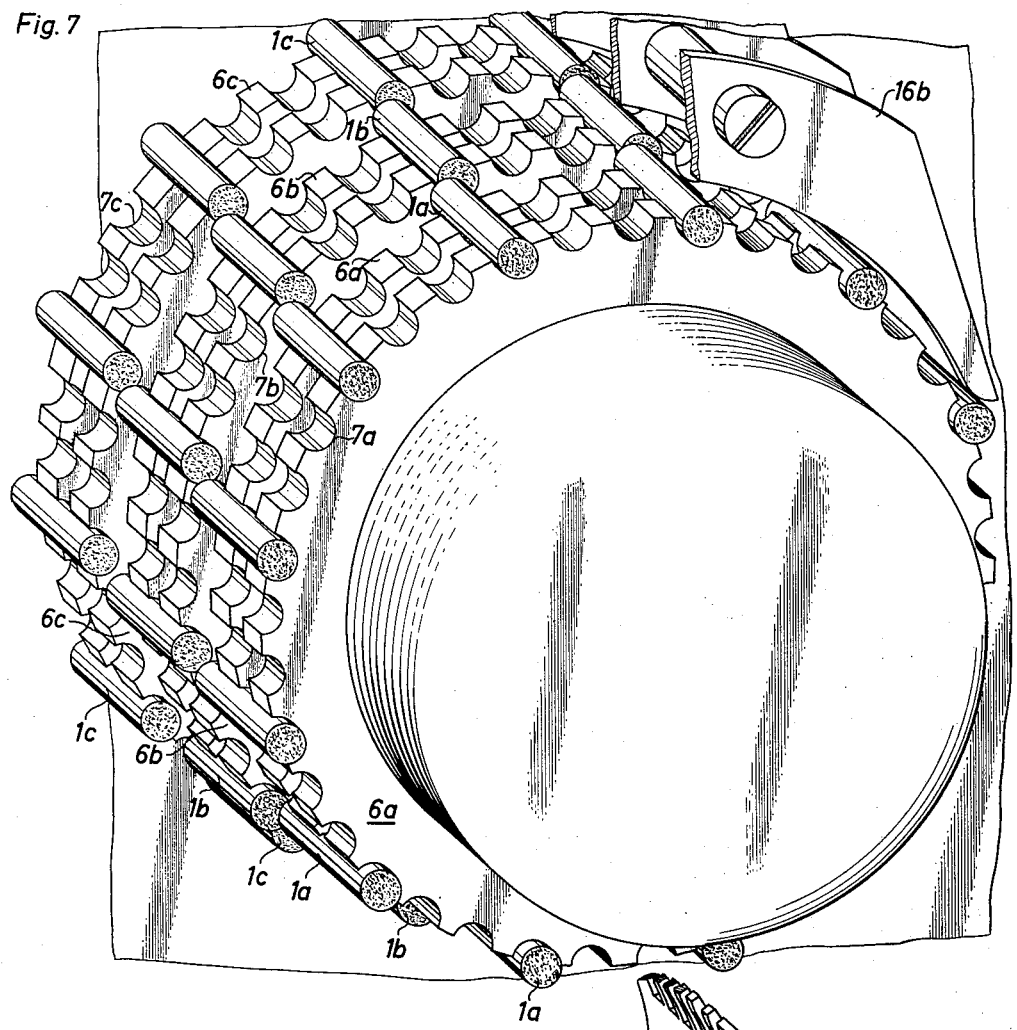
FIG. 7 is a perspective view of the assembled rotatable transfer rings of the second filter plug transfer device.
Figure 8:
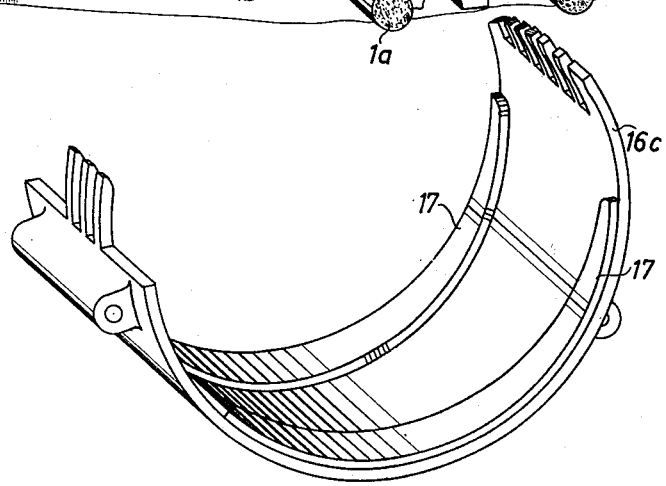
FIG. 8 is a perspective view of the arcuate guide which cooperates with the third filter plug transfer device.

FIGS. 6a and 6b illustrate the path of movement of the double length plugs diagrammatically in developed form. FIG. 6a shows such sections of the rings 6a–6c which extend between the stations II and III. It will be noted that at the first transfer station II the double length plugs designated with (—), (0) and (+) are axially aligned one next to the other. As already stated, the rings 6a, 6b, 6c travel at the same peripheral speed as the drum 4; since, however, they have a different diameter (see FIG. 1) and, therefore, the sections shown in FIG. 6a have different peripheral lengths between the first transfer station II and the second transfer station III, there is a staggering or relative displacement of the double plugs while the plugs advance toward the second transfer station III, so that the centrally moving double plug (0) is set back from the right hand double length plug (+) by one space and the left hand double length plug (—) is set back by two spaces from the double length plug (+) or one space from the double length plug (0), (see FIGS. 6a and 6b, station III).

In these respective displaced positions the double length plugs—again without increasing their peripheral speed—are delivered one at the time at the transfer station III to the carriers or grooves 9 of the conveyor drum 8 which has an axial length corresponding approximately to three times the length of a double length plug (see FIG. 6b). During the movement of the plugs with the drum 8 the stationary deflector or shifting rails 17 arranged closely along the periphery of the rotary drum 8 shift the double length plugs in their axial direction toward the center of the grooves 9 to form a single file which moves toward the conveyor 10 (FIG. 1) which moves at the same speed as the drum 8. The conveyor 10 carries the single file of filter plugs to the next processing station.

In the example shown, the conveyor 10 consists of a rotary drum provided with axially extending grooves 11 on its circumference from which the double length plugs are removed by an intermediate accelerating conveyor 12 provided with grooves 13 and the conveyor 12 transfers the plugs into the grooves 15 of the rotary connector drum 14.

What we claim is:

1. An apparatus for transforming rows of rod-shaped articles each of which contains a plurality of coaxial articles into a single file of axially parallel articles, comprising a first conveyor having equidistant row-receiving holders and being arranged to advance consecutive rows of articles in a direction at right angles to the longitudinal extensions of the rows; a second conveyor spaced from said first conveyor and having equidistant article-receiving carriers, said second conveyor being arranged to advance axially and transversely staggered articles in parallelism with themselves; a third conveyor disposed between and respectively defining with said first and second conveyors a first and a second transfer station, said third conveyor comprising a plurality of conveying elements, one for each article of a row, and means for driving said conveying elements at substantially the same speed, each of said conveying elements including a section extending between said transfer stations and having equidistant article-receiving retainers which advance in a direction from said first toward said second transfer station, said sections including a longest section and a shortest section and the difference in the length of said sections being equal to the distance between a pair of consecutive carriers, the arrangement of said conveying elements being such that the retainers of one of said elements consecutively reaching said first station are aligned with one retainer of each other conveying element so that each of such aligned retainers may receive one article of a given row of articles and that the retainers thereupon deliver the respective articles into consecutive carriers whereby each carrier receives a single article while passing along said second station and the articles received in consecutive carriers are staggered axially and transversely with respect to each other; and shifting means adjacent to said second conveyor for arranging such axially and transversely staggered articles in a single file while the articles advance in said carriers.

2. An apparatus for transforming rows of rod-shaped articles each of which contains a plurality of coaxial articles into a single file of axially parallel articles, comprising a first conveyor arranged to advance parallel rows of articles in a single file and in a direction at right angles to the longitudinal extensions of the rows; a second conveyor spaced from the first conveyor and arranged to advance axially and transversely staggered articles in parallelism with themselves; shifting means for arranging such axially and transversely staggered articles in a single file while the articles are advanced by said second conveyor; and a third conveyor disposed between and respectively defining with said first and second conveyors a first and a second transfer station, said third conveyor comprising a plurality of conveying elements, one for each article of a row of articles, and means for driving said elements at substantially the same speed, said elements comprising article-transferring sections of different lengths extending between said stations, said sections advancing in a direction from said first toward said second station and including a longest and a shortest section, the difference between the lengths of said sections being equal to the distance between the axially staggered articles on said second conveyor whereby the articles of a row received by the respective sections at said first station are staggered transversely while advancing with the sections toward said second station.

3. An apparatus for transforming rows of rod-shaped articles each of which contains a plurality of coaxial articles into a single file of axially parallel articles, comprising a first rotary drum having a plurality of axially parallel row-receiving elongated peripheral holders and being arranged to advance the rows of articles in a direction at right angles to the longitudinal extensions thereof; a second rotary drum spaced from the first drum and having a plurality of equidistant axially parallel article-receiving peripheral carriers, said second drum having an axis of rotation parallel with the axis of said first drum and being arranged to advance transversely and axially staggered articles in parallelism with themselves and in a direction at right angles to the longitudinal extensions thereof; shifting means comprising stationary members adjacent to the periphery of said second drum for arranging such axially and transversely staggered articles in a single file while the articles are being advanced by said second drum; a conveyor comprising a plurality of adjacent rings having axes parallel with and being disposed between said drums, there being one ring for each article in a row of articles and said rings respectively defining with said drums a first and a second transfer station and each thereof having a plurality of equidistant axially parallel peripheral article-receiving retainers advancing in a direction from said first toward said second transfer station, said rings having sections of different lengths extending between said transfer stations for receiving the respective articles from consecutive holders at said first station and for delivering such articles into consecutive carriers of said second drum at said second station so that each carrier receives a single article, said sections including a longest section and a shortest section and the difference in length of said sections being equal to the distance between a pair of adjacent carriers on said second drum; and means for rotating said drums and said rings at substantially identical speeds.

4. An apparatus as set forth in claim 3, wherein said rings are eccentric with respect to each other and wherein the pitch circles of the retainers on said rings are substantially tangential to the pitch circle of said holders at said first transfer station and to the pitch circle of said carriers at said second transfer station.

5. An apparatus as set forth in claim 3, wherein said holder, said carriers and said retainers are grooves provided in the peripheries of said drums and of said rings.

6. An apparatus as set forth in claim 3, wherein the angular distance between said retainers on any one of said rings at least approximates the angular distance between said carriers.

7. An apparatus as set forth in claim 3, wherein the angular distance between said retainers on any one of said rings at least approximates the angular distance between said holders divided by the number of said rings.

8. An apparatus as set forth in claim 3, wherein each row of articles comprises three articles and wherein said third conveyor comprises three rings including a median ring, a first outer ring and a second outer ring and wherein the number of retainers on said section of the median ring exceeds by one the number of retainers on said section of the first outer ring and is one less than the number of retainers on said section of the second outer ring.

9. An apparatus as set forth in claim 8, wherein the diameter of said median ring is greater than the diameter of said first outer ring but smaller than the diameter of said second outer ring.

10. An apparatus as set forth in claim 8, wherein each third retainer of each of said rings receives an article from the consecutive holders of said first drum.

11. In an apparatus for transforming rows of rod-shaped articles each of which contains a plurality of coaxial articles into a single file of axially parallel articles, in combination, a first conveyor arranged to advance parallel rows of articles in a single file and in a direction at right angles to the longitudinal extensions of the rows; a second conveyor spaced from the first conveyor and arranged to advance axially and transversely staggered articles in parallelism with themselves; and a third conveyor disposed between and respectively defining with said first and second conveyors a first and a second transfer station, said third conveyor comprising a plurality of conveying elements, one for each article of a row of articles, and means for driving said elements at substantially the same speed, said elements comprising article-transferring sections of different lengths extending between said stations, said sections advancing in a direction from said first toward said second station and including a longest and a shortest section, the difference between the lengths of said sections being equal to the distance between the axially staggered articles on said second conveyor whereby the articles of a row received by the respective sections at said first station are staggered transversely while advancing with the sections toward said second station.

References Cited in the file of this patent

UNITED STATES PATENTS

| | | |
|---|---|---|
| 612,704 | Clark | Oct. 18, 1898 |
| 1,605,816 | Dietrich | Nov. 2, 1926 |
| 1,963,902 | Hires | June 19, 1934 |
| 2,499,570 | Crafts | Mar. 7, 1950 |
| 2,666,484 | Schubert | Jan. 19, 1954 |
| 2,898,998 | Schur | Aug. 11, 1959 |
| 3,010,561 | Ricke | Nov. 28, 1961 |
| 3,028,946 | Krupp | Apr. 10, 1962 |
| 3,036,581 | Dearsley | May 29, 1962 |